United States Patent [19]
Tanaka et al.

[11] Patent Number: 5,148,883
[45] Date of Patent: Sep. 22, 1992

[54] REGENERATIVE BRAKING ELECTRIC VEHICLE WITH FOUR MOTORS

[75] Inventors: Satoru Tanaka, Anjo; Mutsumi Kawamoto, Tokyo; Hidemitsu Inagaki, Arakawa, all of Japan

[73] Assignee: Aisin AW Co., Ltd., Japan

[21] Appl. No.: 633,343

[22] Filed: Dec. 27, 1990

[30] Foreign Application Priority Data

Dec. 27, 1989 [JP] Japan .................. 1-342133

[51] Int. Cl.⁵ ............................... B60L 7/22
[52] U.S. Cl. ............................. 180/165; 180/197; 180/65.8; 180/246; 318/376; 364/426.02
[58] Field of Search ............... 180/65.1, 65.8, 65.6, 180/242, 244, 246, 233, 165, 6.5, 197, 222; 188/2 A; 318/370, 375, 376, 377, 378, 379, 380, 381, 382; 364/426.02, 426.04

[56] References Cited

U.S. PATENT DOCUMENTS

| | | | |
|---|---|---|---|
| 714,196 | 11/1902 | Kubierschkg | 318/376 |
| 4,021,690 | 5/1977 | Burton | 180/65.5 |
| 4,211,930 | 7/1980 | Fengler | 180/65.8 |
| 4,908,553 | 3/1990 | Hoppie et al. | 318/382 |
| 5,004,061 | 4/1991 | Andruet | 180/65.6 |
| 5,014,800 | 5/1991 | Kawamoto et al. | 180/65.6 |

Primary Examiner—Andres Kashnikow
Assistant Examiner—Richard Camby
Attorney, Agent, or Firm—Lorusso & Loud

[57] ABSTRACT

An electric vehicle is equipped with four electric motors, one for driving each of the four wheels, load sensors for detecting the loads applied to the wheels, and a control unit. The control unit determines the driving forces distributed to the wheels upon regeneration according to the loads applied to the wheels in such a way as to improve safety.

7 Claims, 5 Drawing Sheets

REGENERATIVE BRAKING ELECTRIC VEHICLE WITH FOUR MOTORS

BACKGROUND OF THE INVENTION

1. Field of the Invention

The present invention relates to an electric vehicle in which each drive wheel is independently driven by its own (dedicated) electric motor.

2. Prior Art

Vehicles which use electric motors to drive the wheels are known in the prior art. A single electric motor is conventionally used to drive only the front wheels or only the rear wheels. In another prior art approach, two electric motors are employed to drive the front wheels and the rear wheels, respectively.

Generally in an electrically-driven vehicle, when energy is fed back into the power system, the motors are regeneratively braked. In the prior art electric vehicle, a single motor drives two wheels and so it is inevitable that the same regenerative braking force is applied to the left and right drive wheels driven by the motor. This has posed problems. In particular, when the brakes are hit, or when the brakes are applied while the vehicle is making a turn, unequal loads are applied to the wheels. That is, a heavy load is applied to one wheel, while very light loads are applied to the other wheels. In this way, when the loads applied to the left and right wheels differ, i.e. when the forces with which the wheels are pressed against the road differ, if the same braking force is applied to the left and right wheels, then the lightly loaded wheel tends to easily lock. This makes it difficult to ensure that the vehicle continues stable travel.

SUMMARY OF THE INVENTION

It is an object of the present invention to provide an electric vehicle which can travel with improved stability on regeneration, and in which the driving force is better distributed to the wheels under normal operating conditions.

The above object is achieved by a electric vehicle in which the wheels are individually driven by respective electric motors, and in which the braking forces of the motors are distributed to the wheels according to the loads applied to the wheels on regeneration.

In accordance with the invention, the loads applied to the wheels are detected by load sensors. The driving forces and the braking forces applied to the motors are determined, based on the detected loads. A small driving force or a small braking force is applied to a motor driving a lightly loaded wheel. A large driving force or a large braking force is applied to a motor driving a heavily loaded wheel. Hence, it is unlikely that a lightly loaded wheel will lock as encountered in the prior art electric vehicle. Consequently, optimum driveability is provided at all times and safety is improved.

Other objects and feature of the present invention will appear in the course of the description of the preferred embodiments which follows.

BRIEF DESCRIPTION OF THE DRAWINGS FIG. 1 is a circuit diagram of electrical power distribution and control for an electric vehicle according to one embodiment of the present invention;

FIGS. 2a–2d are flowcharts illustrating various operations performed by the control unit shown in FIG. 1; and FIGS. 3a–3c are diagrams illustrating the method of finding the amounts of traveling load when an acceleration sensor is used as a load sensor.

DETAILED DESCRIPTION OF THE PREFERRED EMBODIMENTS

Figure 1:
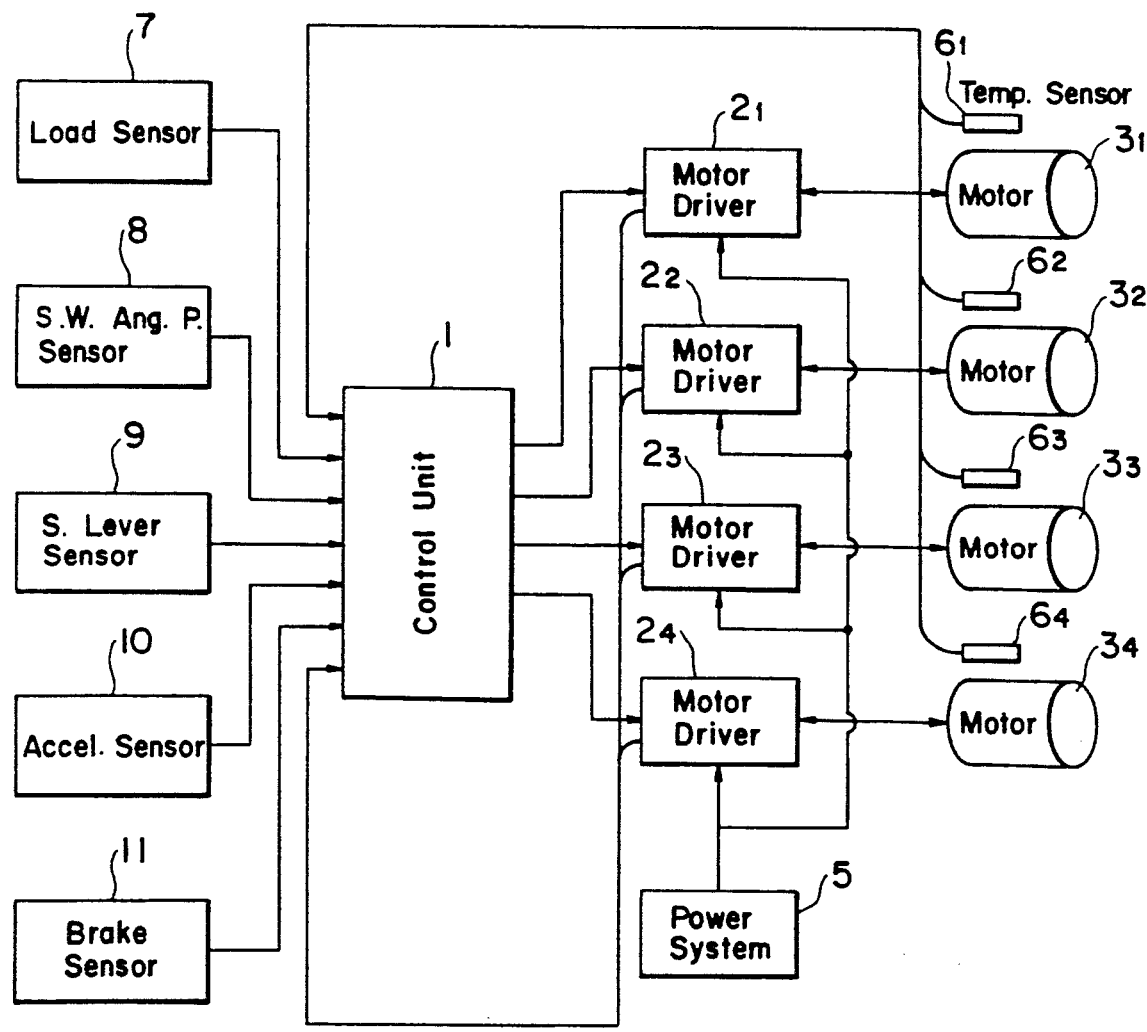

As shown in FIG. 1, the vehicle includes a control unit 1, motor drivers $2_1$, $2_2$, $2_3$, $2_4$ connected with the control unit 1, electric motors $3_1$, $3_2$, $3_3$, $3_4$ connected with the motor drivers $2_1$–$2_4$, respectively, a power system 5 connected with the drivers $2_1$–$2_4$, temperature sensors $6_1$, $6_2$, $6_3$, $6_4$, load sensors 7 (only one is shown), a sensor 8 for detecting the angular position of the steering wheel (not shown), a shift lever sensor 9, an accelerator pedal position sensor 10, and a brake sensor 11. All of these sensors input control signals to the control unit 1.

The control unit 1 consists of a microprocessor or other calculator and memories including a RAM and ROMs. The control unit 1 processes the input signals as described below to determine the driving forces and the braking forces applied to the wheels and to instruct the motor drivers accordingly. Since the control unit 1 processes digital signals, it incorporates an A/D converter (not shown) which converts analog signals fed from the sensors into digital form.

In the novel electric vehicle of the present invention, each of the electric motors $3_1$–$3_4$ individually drives one of the four wheels (not shown). A given electrical current is supplied to the motors $3_1$–$3_4$ from the motor drivers $2_1$–$2_4$, respectively. Each motor driver consists of a switching circuit. The drivers $2_1$–$2_4$ supply currents specified by the control unit 1 to the motors $3_1$–$3_4$, respectively. The drivers $2_1$–$2_4$ also inform the control unit 1 of the rotational frequencies of the motors $3_1$–$3_4$, respectively. The rotational frequencies of the motors $3_1$–$3_4$ are detected as output signals from resolvers (not shown).

The power system 5 acts to power the motors $3_1$–$3_4$, and consists of a battery or the like.

The temperature sensors $6_1$–$6_4$ serve to detect the temperatures of the motors $3_1$–$3_4$, respectively, and are located close to the motors $3_1$–$3_4$, respectively. The load sensors 7 detect the loads applied to the wheels, and each consists of a displacement gauge or acceleration sensor. The sensor 8 detects the angular position of the steering wheel (not shown). The shift lever sensor 9 senses whether the shift lever is in forward, reverse or neutral. The accelerator pedal position sensor 10 detects the position or distance traveled by the accelerator pedal. The brake sensor 11 detects the position or distance traveled by the brake pedal. The output signals from these sensors are accepted by the control unit 1 at given timing, converted into digital form by the A.D converter (not shown), and processed.

Figure 2A:
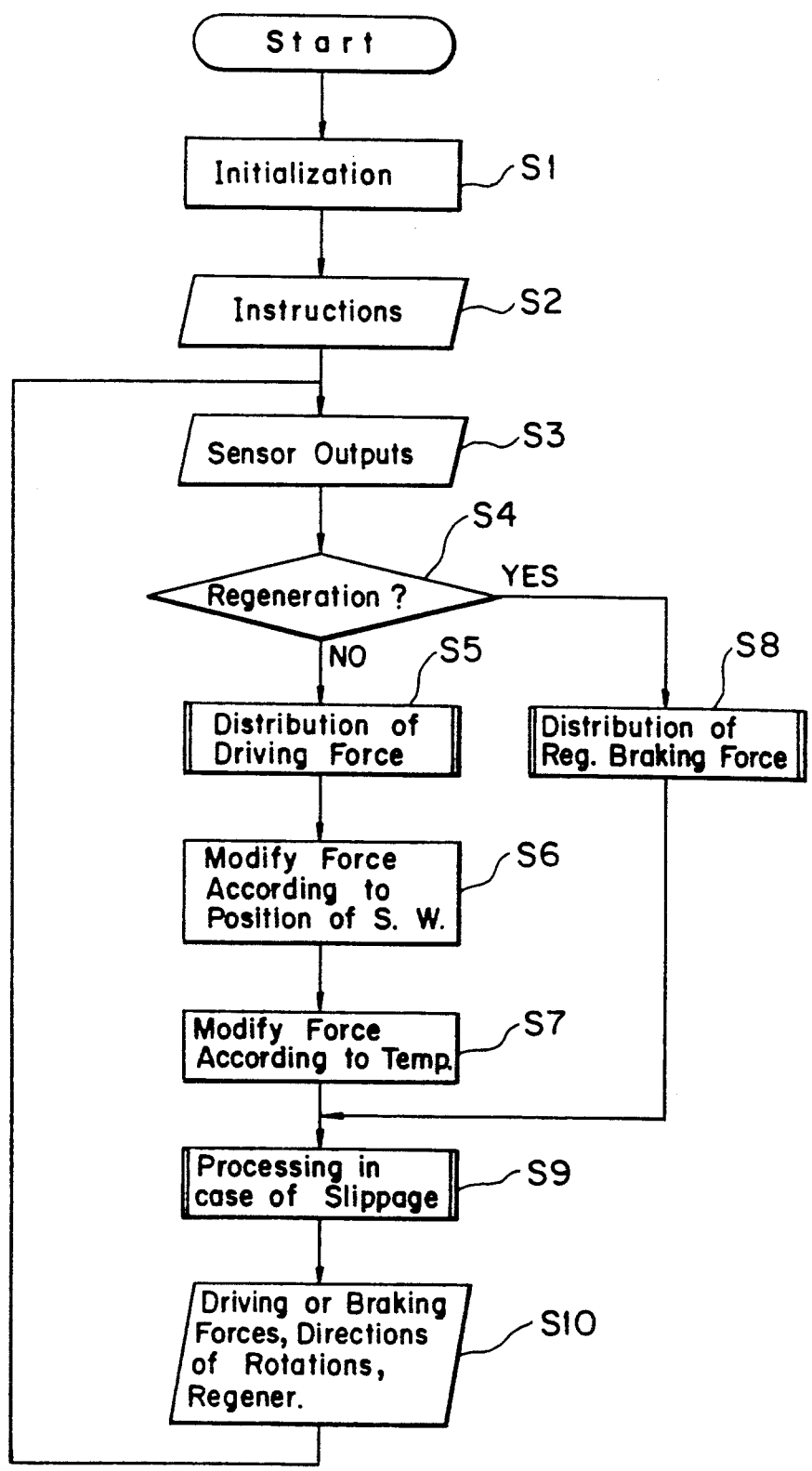

FIG. 2(a) is a flowchart illustrating the whole processing performed by the control unit 1. When the ignition key is turned on, the control unit 1 starts the processing. First, initialization is performed (step 1). Then, the unit instructs the motor drivers $2_1$–$2_4$ to operate (step 2). The drivers $2_1$-$2_4$ start to operate. Subsequently, the control unit 1 accepts the output signals from the sensors (step 3). Specifically, the control unit receives signals indicative of the temperatures of the motors $3_1$-$3_4$ from the temperature sensors $6_1$-$6_4$. The control unit receives a signal indicative of the angular position of the steering wheel from the steering wheel position sensor 8, a signal indicative of the position of the shift lever from the shift lever sensor 9, a signal indicative of the distance traveled by the accelerator pedal from the accelerator pedal position sensor 10, a signal indicative of the distance traveled by the brake pedal from the brake sensor 11 and signals indicative of the rotational frequencies of the motors $3_1$-$3_4$ from the motor drivers $2_1$-$2_4$. The accepted data is converted into digital form and stored in the RAM (not shown).

When the data is fully accepted, the control unit 1 makes a decision to determine whether regeneration is now being carried out, based on the data obtained from the brake sensor 11 (step 4). If no regeneration is indicated, then the control unit judges that the vehicle is traveling under normal conditions, and then the control unit 1 goes to step 5, where proper distribution of the driving force to the motors $3_1$-$3_4$ is determined. If regeneration is being effected, the control unit proceeds to step 8, where proper distribution of the braking force to the motors $3_1$-$3_4$ is determined.

Figure 2B:
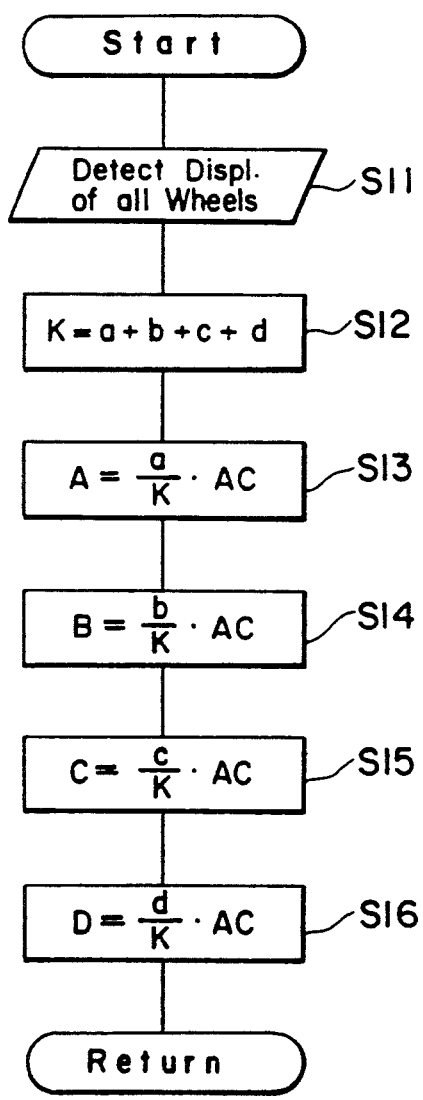
Figure 2C:
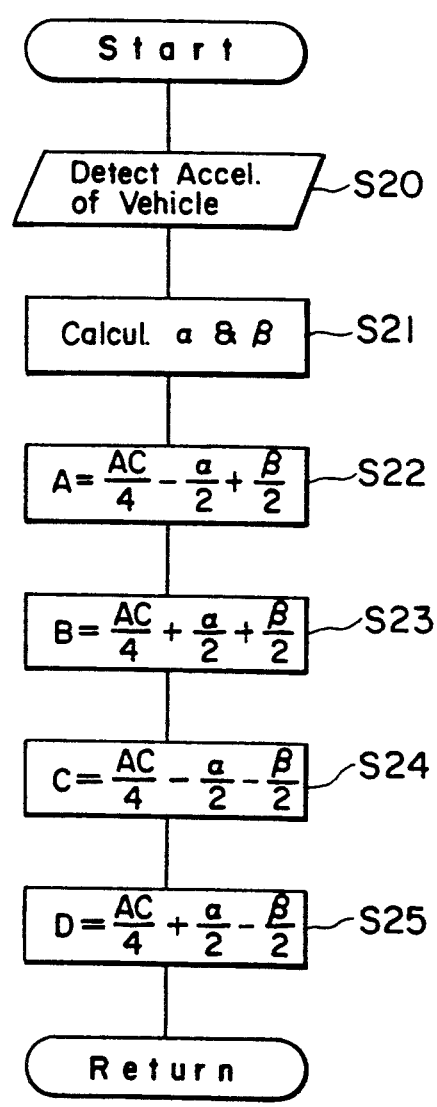

The distribution of the driving force is determined as illustrated in FIG. 2(b). The distribution of the braking force is determined as illustrated in FIG. 2(c). FIG. 2(b) is a flowchart illustrating a series of operations performed to determine the distribution of driving forces when displacement gauges are used as the load sensors 7. First, the control unit 1 accepts the output signals from all the displacement gauges for the wheels, and finds the loads applied to the wheels (step 11). As an example, each displacement gauge consists of a sliding member and a stationary member included in a potentiometer. Either the sliding member or the stationary member is attached to the frame of the body of the vehicle, while the other member is affixed to a part moving with the motor $3_1$, $3_2$, $3_3$ or $3_4$. In this construction, the resistance value indicated by the potentiometer represents the amount of displacement of the suspension spring. Therefore, the load applied to each wheel can be found from the resistance value. Let a, b, c, d be the amounts of displacement of the springs at right front wheel, at the left front wheel, at the right rear wheel, and at the left rear wheel, respectively. The control unit 1 calculates the sum of the amounts of displacement at the wheels, i.e. the sum K of the loads (step 12). The driving force A applied to the right front wheel is found (step 13). The driving force B applied to the left front wheel is found (step 14). The driving force C applied to the right rear wheel is found (step 15). The driving force D applied to the left rear wheel is found (step 16). The driving force necessary for the vehicle is indicated by AC in the flowchart. For example, a map is prepared in which various values of driving force are correlated with various combinations of values of the vehicle speed and the throttle opening, the map being stored in the control unit memory. The driving force is determined from the throttle opening and the vehicle speed accepted in step 3 by referring to the map. The vehicle speed can be the maximum value or the average value of the rotational frequencies of the motors $3_1$-$3_4$.

Figure 3A:
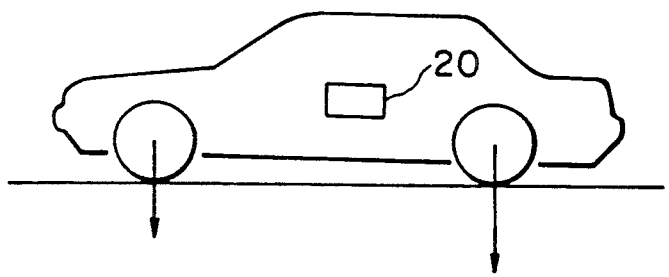
Figure 3B:
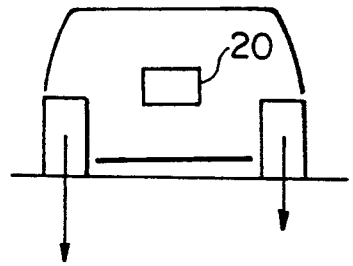
Figure 3C:
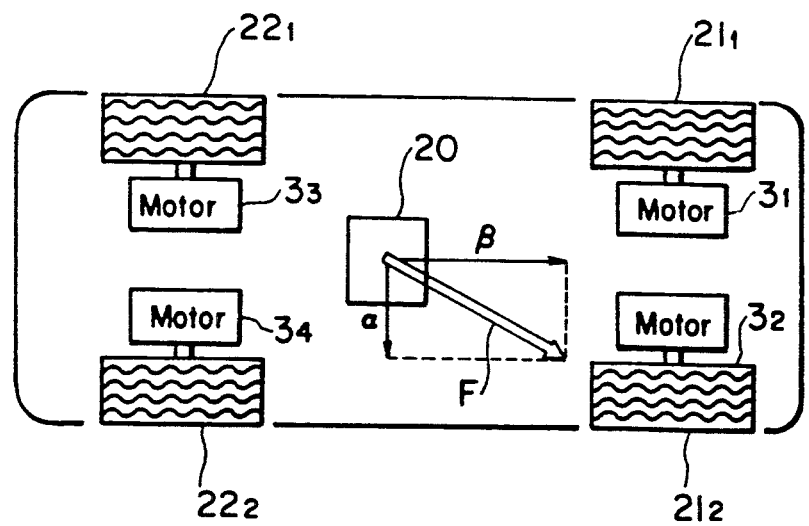

In this way, displacement gauges are used as the load sensors, and the processing illustrated in FIG. 2(b) is performed to distribute the driving force among the wheels responsive to the loads applied to them.

Where accelerometers are used as the load sensors 7, the processing illustrated in the flowchart of FIG. 2(c) is performed. First, the control unit I accepts the output signals from the load sensors, each consisting of an acceleration sensor, and calculates the acceleration of the vehicle (step 20). Then, the amount of traveling load $\alpha$ in the lateral direction of the vehicle and the amount of traveling load $\beta$ in the longitudinal direction of the vehicle are found (step 21). As shown in FIG. 3, the acceleration sensor 20 is located close to the center of gravity of the vehicle. The tilt of the vehicle is found from the output signal from the acceleration sensor 20. The tilt of the vehicle indicates the direction in which the load is applied. Therefore, the loads applied to front wheels $21_1$, $21_2$ and the rear wheels $22_1$, $22_2$ can be determined. More specifically, let F be the acceleration detected with the acceleration sensor 20, as shown in FIG. 3(c). The amount of traveling load $\alpha$ in the lateral direction is the lateral component of the acceleration F. The amount of traveling load B in the longitudinal direction is the longitudinal component of the acceleration. Therefore, we can assume that a load of $\alpha/2$ is applied to each of the left and right wheels, and that a load of $\beta/2$ is applied to each of the front and rear wheels. Let AC be the driving force necessary for the vehicle. Let A, B, C and D be the driving forces assigned to the right front wheel, the left front wheel, the right rear wheel and the left rear wheel, respectively. These forces A-D can be calculated, using formulas illustrated in steps 22-25, respectively. Obviously, the driving force AC necessary for the vehicle can be found in the same manner as the foregoing.

As described thus far, where acceleration sensors are used as the load sensors 7, the driving force can be distributed among the wheels according to the loads applied to them by performing the processing illustrated in FIG. 2(c).

The processing for determining the distribution of the driving force (step 5 in FIG. 2(a)) has been described. The processing for determining the distribution of regenerative braking force (step 8) is performed, using similar formulas, except that the driving force AC necessary for the vehicle (FIG. 2(b), (c)) is replaced by the braking force BC necessary for the vehicle. Specifically, where displacement gauges are utilized as the load sensors 7, the braking force A assigned to the right front wheel, the braking force B assigned to the left front wheel, the braking force C assigned to the right rear wheel, and the braking force D assigned to the left rear wheel are calculated, using the formulas:

$$A = (a/K) \times BC$$

$$B = (b/K) \times BC$$

$$C = (c/K) \times BC$$

$$D = (d/K) \times BC$$

where a is the amount of displacement of the right front wheel, b is the amount of displacement of the left front wheel, c is the amount of displacement of the right rear wheel and e is the amount of displacement of the left rear wheel. The relationship $K = a+b+c+d$ holds. Where acceleration sensors are used as the load sensors 7, the braking force A assigned to the right front wheel, the braking force B assigned to the left front wheel, the braking force C assigned to the right rear wheel, and the braking force D assigned to the left rear wheel are calculated, using the formulas:

$$A=(BC/4)-(\alpha/2)+(\beta/2)$$

$$B=(BC/4)-(\alpha/2)+(\beta/2)$$

$$C=(BC/4)-(\alpha/2)+(\beta/2)$$

$$D=(BC/4)-(\alpha/2)+(\beta/2)$$

where $\alpha$ is the amount of traveling load in the lateral direction of the wheel and $\beta$ is the amount of traveling load in the longitudinal direction of the vehicle.

A map is prepared in which various values of the braking force are correlated with corresponding various distances traveled by the brake pedal and stored in the memory of the control unit 1. The braking force BC necessary for the vehicle can be found from the output value from the brake sensor 11 accepted in step 3, by referring to the map.

If the result of the decision made in step 4 (FIG. 2(a)) is that regeneration is not carried out, then the control unit 1 performs the above processing to determine the distribution of the driving force (step 5). After calculating the driving forces assigned to the motors $3_1$-$3_4$, the driving forces are modified according to the angular position of the steering wheel (step 6). Also, the driving forces are modified, taking into account the temperatures of the motors (step 7). When the driving forces are modified according to the angular position of the steering wheel, if the steering wheel is rotated through a large angle, as when the vehicle turns a tight corner, then the driving force assigned to the motor driving the innermost wheel is reduced compared with the force obtained in step 5, taking account of the fact that the inner wheels move through a narrower arc than the outer wheels. The processing for modifying the driving force, taking account of the temperatures of the motors is performed to suppress the driving forces so as to prevent the motor coils from breaking or burning out when the motor temperatures have exceeded their temperature limit or when such an undesirable event is forecast. The amount by which the driving forces are to be reduced by such a modification may be stored as a map. Specifically, a map is prepared in which various values of a factor k ($0 \leq k \leq 1$) are correlated with corresponding values of the angular position of the steering wheel, the driving force obtained in step 5 being multiplied by the factor k. Another map is stored in the memory in which various values of a factor k' ($0 \leq k' \leq 1$) are correlated with corresponding motor temperatures, the driving force obtained in step 5 being multiplied by the factor k'. The factors k and k' are found from the angular position of the steering wheel and the motor temperatures accepted in step 3, by referring to the above maps. The values of the driving force obtained in step 5 are multiplied by the factors k and k'.

Figure 2D:
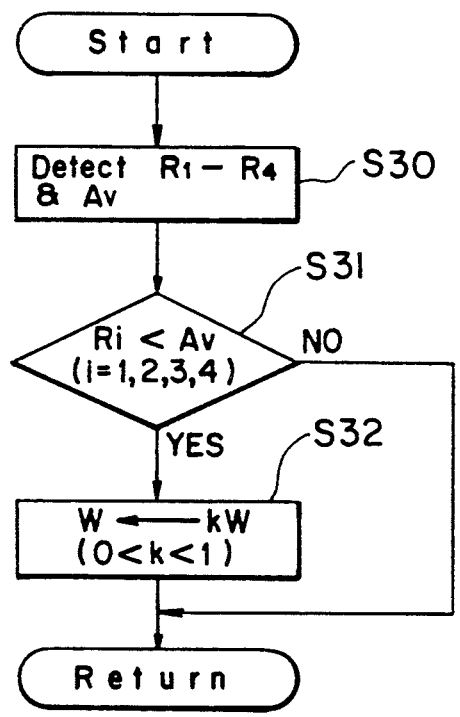

When the correction of the driving forces obtained in step 5 is compiled, or when regenerative braking forces are derived from the processing step 8, the control unit 1 then processes relevant information in the case of slippage (step 9). This is done to suppress the determined driving forces or braking forces because, if large driving forces or braking forces are applied to slipping wheels, then the wheels may lock, thus creating a danger. The processing is illustrated in FIG. 2(d). First, the control unit 1 receives the output signals from the motor drivers $2_1$-$2_4$, the output signals indicating the rotational frequencies of the motors. The control unit 1 then calculates the rotational frequencies $R_1$-$R_4$ of the wheels and the average Au of these frequencies (step 30). The frequencies $R_1$-$R_4$ are compared with the average Au (step 31). If the rotational frequency of any wheel is lower than the average Au, then this wheel is regarded as slipping. The obtained driving force or braking force W is multiplied by a given factor k ($0 < K < 1$) to determine the final driving force or braking force W (step 32). The factor k may be set at will but we have found that it is preferable to set the factor to approximately 0.75.

When the processing illustrated in step 9 is completed in case of slippage, the control unit 1 informs the motor drivers $2_1$-$2_4$ of the finally obtained driving forces or braking forces, the directions of the rotations of the motors, and the presence or absence of regeneration. Of course, the finally obtained driving forces or braking forces are the values obtained by the processing illustrated in step 9. The directions of the rotations are indicated, according to the output signal from the shift lever sensor 9 accepted in step 3. More specifically, if it is found that the shift lever is in forward, the motor drivers $2_1$-$2_4$ are instructed to rotate forward. If it is found that the lever is in reverse, the drivers $2_1$-$2_4$ are ordered to rotate in reverse. With respect to the indication of the presence or absence of regeneration, if the result of the decision made in step 4 is that regeneration is carried out, then a regeneration flag is set. If regeneration is not carried out, then the flag is not set. As described above, the control unit 1 informs the motor drivers $2_1$-$2_4$ of the finally decided driving forces or braking forces, the directions of the rotations, and the presence or absence of regeneration. The drivers $2_1$-$2_4$ determine the current values supplied to their respective motors, the direction of the currents and determine whether the phases of the currents are caused to lead or lag the voltages. The drivers perform switching action according to these determinations. As a result, electric currents having given amplitudes and given phases are supplied to the motors $3_1$-$3_4$ in given directions.

After the processing of step 10 is completed in this way, the control unit 1 repeats the processing of step 3 and the following steps at intervals of 5 msec, for example.

As can be understood from the description made thus far, in accordance with the present invention, the driving forces and the braking forces applied to the wheels are determined, taking account of the loads on the wheels. Hence, safety is enhanced.

While one preferred embodiment of the invention has been described above, it is to be noted that the invention is not limited to the above example and that various modifications and changes may be made. For example, the driving force AC or braking force BC necessary for the vehicle can also be determined by known methods other than the above-described method. Also, the formulas used to calculate the driving forces or braking forces applied to the motors $3_1$-$3_4$ are not restricted to the formulas given above. The above-described formulas can be modified. In the above example, the obtained driving forces are modified, taking account of the angular position of the steering wheel and the motor temperatures. The driving forces may be further modified, taking other factors into account.

We claim:

1. An electric vehicle having four wheels and comprising:
   electric drive means for independently driving and braking each of the four wheels, said electric drive means including four electric motors, one electric motor being associated with each of the four wheels;
   means for detecting the loading on each wheel and generating signals representing the loadings on the four respective wheels; and
   signal processing means for receiving said load signals, for calculating a distribution of braking forces to the four wheels and for generating output signals to said electric drive means to apply a braking force to its associated wheel in accordance with the calculated distribution of braking force.

2. The electric vehicle of claim 1, wherein said load sensing means comprises at least four load sensors, one load sensor being associated with each of the four wheels to determine the loading on the wheel with which it is associated.

3. The electric vehicle of claim 1 further comprising a brake sensor for determining regeneration whereby said processing means instructs said electric drive means to brake said wheels.

4. The electric vehicle of claim 2 wherein each of said load sensors is a displacement gauge.

5. The electric vehicle of claim 2 wherein said load detection means is an accelerometer.

6. An electric vehicle comprising:
   a plurality of wheels;
   a plurality of electric motors for independently driving and braking each wheel;
   load sensing means for detecting the loading on each individual wheel;
   a steering wheel position sensor for detecting the angle through which a steering wheel is turned;
   a brake sensor for sensing when the brakes have been applied; and
   a control unit for determining the driving force and braking force to be distributed to each wheel, responsive to the detected loading on that wheel, the angle through which the steering wheel has been turned, and the signal from said brake sensor.

7. The electric vehicle of claim 6 further comprising temperature sensors for independently detecting the temperatures of each of said motors and generating signals representative of said detected temperatures; and
   means associated with said control unit for modifying said calculated forces responsive to said detected temperatures.

* * * * *